US012612486B2

(12) United States Patent
Doerr et al.

(10) Patent No.: US 12,612,486 B2
(45) Date of Patent: Apr. 28, 2026

(54) HIGH-TEMPERATURE CROSS-LINKING DISPERSION

(71) Applicant: Covestro Deutschland AG, Leverkusen (DE)

(72) Inventors: Sebastian Doerr, Düsseldorf (DE); Petra Janssen, Kerken (DE); Ingo Gipperich, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 663 days.

(21) Appl. No.: 17/801,828

(22) PCT Filed: Mar. 1, 2021

(86) PCT No.: PCT/EP2021/054957
§ 371 (c)(1),
(2) Date: Aug. 24, 2022

(87) PCT Pub. No.: WO2021/175748
PCT Pub. Date: Sep. 10, 2021

(65) Prior Publication Data
US 2023/0078540 A1 Mar. 16, 2023

(30) Foreign Application Priority Data
Mar. 5, 2020 (EP) ..................................... 20161139

(51) Int. Cl.
| | |
|---|---|
| *C08G 18/80* | (2006.01) |
| *C08G 18/08* | (2006.01) |
| *C08G 18/28* | (2006.01) |
| *C08G 18/48* | (2006.01) |
| *C08G 18/70* | (2006.01) |
| *C08G 18/79* | (2006.01) |
| *C09D 175/08* | (2006.01) |
| *C09J 175/08* | (2006.01) |

(52) U.S. Cl.
CPC ..... *C08G 18/8096* (2013.01); *C08G 18/0866* (2013.01); *C08G 18/2825* (2013.01); *C08G 18/283* (2013.01); *C08G 18/4833* (2013.01); *C08G 18/706* (2013.01); *C08G 18/792* (2013.01); *C08G 18/8064* (2013.01); *C09D 175/08* (2013.01); *C09J 175/08* (2013.01)

(58) Field of Classification Search
CPC ............ C08G 18/8096; C08G 18/4833; C08G 18/0866; C08G 18/2825; C08G 18/283; C08G 18/706; C08G 18/792; C08G 18/8064; C09D 175/08; C09J 175/08
See application file for complete search history.

(56) References Cited

U.S. PATENT DOCUMENTS

| | | | |
|---|---|---|---|
| 4,745,151 A | 5/1988 | Noll et al. | |
| 5,126,393 A | 6/1992 | Blum et al. | |
| 5,280,062 A | 1/1994 | Blum et al. | |
| 5,349,041 A * | 9/1994 | Blum .................... | C09K 3/1021 |
| | | | 528/80 |
| 5,723,536 A | 3/1998 | Baumbach et al. | |
| 6,063,860 A | 5/2000 | Rimmer et al. | |
| 6,187,860 B1 | 2/2001 | König et al. | |
| 7,691,941 B2 | 4/2010 | Dörr et al. | |
| 9,617,453 B2 | 4/2017 | Campbell et al. | |
| 2004/0116594 A1* | 6/2004 | Bhattacharjee .... | C08G 18/4202 |
| | | | 524/589 |
| 2004/0229047 A1 | 11/2004 | Gurtler et al. | |
| 2004/0260014 A1 | 12/2004 | Munzmay et al. | |
| 2008/0045641 A1 | 2/2008 | Dörr et al. | |
| 2016/0200858 A1* | 7/2016 | Fukuda .................. | C09J 175/04 |
| | | | 540/531 |
| 2019/0315910 A1 | 10/2019 | Fukuda et al. | |

FOREIGN PATENT DOCUMENTS

| | | |
|---|---|---|
| CN | 1572811 A | 2/2005 |
| CN | 101081893 A | 12/2007 |
| CN | 102161743 A | 8/2011 |
| CN | 105452320 A | 3/2016 |
| CN | 109593182 A | 4/2019 |
| DE | 19914885 A1 | 10/2000 |
| EP | 0157291 B1 | 7/1989 |
| JP | 2000044649 A * | 2/2000 |

OTHER PUBLICATIONS

Machine English translation of JP 2000-044649, Asahina, Feb. 15, 2000.*
International Search Report, PCT/EP2021/054957, date of mailing: Jun. 7, 2021, Authorized officer: Ralf Buestrich.

* cited by examiner

*Primary Examiner* — Patrick D Niland
(74) *Attorney, Agent, or Firm* — The Webb Law Firm

(57) ABSTRACT

The present invention relates to a process for preparing at least one blocked polyisocyanate, comprising the following steps: (A) reacting at least one polyisocyanate with at least one thermally cleavable blocking agent selected from the group consisting of primary, monofunctional alcohols and mixtures thereof to obtain at least one partially blocked polyisocyanate, (B) reacting the at least one partially blocked polyisocyanate from step (A) with at least one non-ionic hydrophilizing agent to obtain an intermediate product, and (C) reacting the intermediate product obtained in step (C) with at least one thermally cleavable blocking agent selected from the group consisting of primary, monofunctional alcohols and mixtures thereof, to obtain the at least one blocked polyisocyanate. The invention further relates to a correspondingly obtained blocked polyisocyanate, to the use of the blocked polyisocyanate for producing coating agents, adhesives, sealants or elastomers, to corresponding coating agents, adhesives, sealants or elastomers, and to substrates that are provided with coatings obtained using the at least one blocked polyisocyanate according to the invention.

19 Claims, No Drawings

HIGH-TEMPERATURE CROSS-LINKING DISPERSION

The present invention relates to a process for preparing at least one blocked polyisocyanate, comprising the steps: (A) reacting at least one polyisocyanate with at least one thermally eliminatable blocking agent selected from the group consisting of primary, monofunctional alcohols and mixtures thereof, in order to obtain at least one partly blocked polyisocyanate, (B) reacting the at least one partly blocked polyisocyanate from step (A) with at least one nonionic hydrophilizing agent in order to obtain an intermediate, (C) reacting the intermediate obtained in step (B) with at least one thermally eliminatable blocking agent selected from the group consisting of primary, monofunctional alcohols and mixtures thereof, in order to obtain the at least one blocked polyisocyanate, to a blocked polyisocyanate obtained in a corresponding manner, to the use of said blocked polyisocyanate for production of coating compositions, adhesives, sealants or elastomers, to corresponding coating compositions, adhesives, sealants or elastomers, and to substrates provided with coatings obtainable using the at least one blocked polyisocyanate of the invention.

In the last few years, the importance of aqueous paints and coating compositions has increased significantly on account of ever stricter emissions guidelines with regard to the solvents released on paint application. Even though aqueous paint systems are now already available for many fields of application, these are often incapable of reaching the high quality level of conventional solvent-based paints with regard to solvent and chemical stability or else elasticity and mechanical strength.

Aqueous paint systems based on aqueous polyurethane dispersions frequently also still contain considerable amounts of solvent. It is generally impossible to avoid these solvents in polyurethane dispersions since the production of corresponding dispersions via prepolymers often requires solvents, or what is called a cosolvent (coalescence agent) frequently has to be added to the dispersions in order to achieve lowering of the minimum film formation temperature. This ensures that sufficiently hard layers are formed on formation of films of the coating compositions even at or below room temperature. The PUR dispersions and paint formulations are frequently also not storage-stable without solvents.

For example, the solvent N-methylpyrrolidone (NMP) is still used to a degree in the field of aqueous dispersions and paints. One example is carboxylic acid-hydrophilized polyisocyanate crosslinker dispersions with dimethylpyrazole-blocked isocyanate groups, which are described for example in EP-A 0 942 023. These crosslinker dispersions, and the paints produced therefrom, contain NMP as cosolvent.

Cosolvent-free production of the DMP-blocked polyisocyanate crosslinker described in EP-A 0 942 023 by dispensing with the cosolvent is not possible for reasons of viscosity.

The nonionically hydrophilized polyisocyanate crosslinker dispersions described in WO 1997/012924 with pyrazole-blocked isocyanate groups contain about 7% by weight of butylglycol as cosolvent. Similarly to NMP, this features a comparatively high boiling point. Removal for production of solvent-free aqueous dispersions is not possible.

DE 19914885 describes polyurethane dispersions with dimethylpyrazole-blocked isocyanate groups for production of glass fibre sizes. These dispersions are produced using an organic solvent which, after dispersion in water, is removed again from the dispersion by distillation.

DE 3613492 describes an acetone process for production of cosolvent-free polyurethane-polyurea dispersions. The prepolymer, which is not blocked in this case, is prepared in a 20 to 50 percent by weight solution in a volatile organic solvent, for example acetone, and the solvent, after dispersion in water, is removed by distillation.

The replacement of NMP in the process according to EP-A 0 942 023 by acetone in amounts of 50% or 62% by weight as in DE 19914885 leads to DMP-blocked polyisocyanate crosslinkers, but these lack storage stability.

DE 10 2006 025313 A1 discloses a process for preparing aqueous solvent-free PUR crosslinker dispersions with pyrazole-blocked isocyanate groups. The blocked polyisocyanates are obtained by this process in that the polyisocyanate is reacted with a thermally eliminatable blocking reagent, followed by a hydroxycarboxylic acid and a di- or polyfunctional chain extension component. The aqueous dispersions thus obtained have good usability for the production of solvent-free baking varnishes, but have only limited stability in some formulations.

It was therefore an object of the present invention to provide a process for preparing a blocked polyisocyanate and an aqueous dispersion comprising the blocked polyisocyanate, which avoids the disadvantages of the prior art processes, and makes it possible to obtain an aqueous dispersion which has particularly high storage stability, and enables use in a maximum variety of formulations. Furthermore, the blocked polyisocyanate present in the aqueous dispersion is to be converted to the unblocked polyisocyanate only at high temperatures, for example at above 170° C.

These objects are achieved by the process of the invention for preparing at least one blocked polyisocyanate, comprising the following steps:

(A) reacting at least one polyisocyanate with at least one thermally eliminatable blocking agent selected from the group consisting of primary, monofunctional alcohols and mixtures thereof, in order to obtain at least one partly blocked polyisocyanate, (B) reacting the at least one partly blocked polyisocyanate from step (A) with at least one nonionic hydrophilizing agent in order to obtain an intermediate, (C) reacting the intermediate obtained in step (B) with at least one thermally eliminatable blocking agent selected from the group consisting of primary, monofunctional alcohols and mixtures thereof, in order to obtain the at least one blocked polyisocyanate.

The objects are also achieved by the blocked polyisocyanate of the invention, obtainable by the process of the invention.

The objects are also achieved by the inventive use of the blocked polyisocyanate of the invention for production of coating compositions, adhesives, sealants or elastomers.

The objects are also achieved by coating compositions, adhesives, sealants or elastomers of the invention, comprising at least one blocked polyisocyanate of the invention.

The objects are also achieved by the substrate of the invention provided with coatings obtainable using the at least one blocked polyisocyanate of the invention.

The present invention relates to the abovementioned process for preparing at least one blocked polyisocyanate. The individual steps of the process of the invention are described in detail hereinbelow.

Step (A) of the process of the invention comprises the reacting of at least one polyisocyanate with at least one thermally eliminatable blocking agent selected from the group consisting of primary, monofunctional alcohols and mixtures thereof, in order to obtain at least one partly blocked polyisocyanate.

According to the invention, at least one polyisocyanate is used. According to the invention, it is preferable that an essentially homogeneous polyisocyanate is used. According to the invention, it is also possible that a mixture comprising two, three or more different polyisocyanates is used.

Polyisocyanates suitable in accordance with the invention that are used may be the NCO-functional compounds having a functionality of preferably 2 or more that are known per se to the person skilled in the art. According to the invention, these are preferably aliphatic, cycloaliphatic, aliphatic and/ or aromatic di- or triisocyanates and the higher molecular weight conversion products thereof, especially having iminooxadiazinedione, isocyanurate, uretdione, urethane, allophanate, biuret, urea, oxadiazinetrione, oxazolidinone, acylurea and/or carbodiimide structures, which further preferably have two or more free NCO groups.

Di- or triisocyanates that are preferred in accordance with the invention are, for example, tetramethylene diisocyanate, cyclohexane 1,3- and 1,4-diisocyanate, hexamethylene diisocyanate (HDI), 1-isocyanato-3,3,5-trimethyl-5-isocyanatomethylcyclohexane (isophorone diisocyanate, IPDI), methylenebis(4-isocyanatocyclohexane), tetramethylxylylene diisocyanate (TMXDI), triisocyanatononane, tolylene diisocyanate (TDI), diphenylmethane 2,4'- and/or 4,4'-diisocyanate (MDI), triphenylmethane 4,4'-diisocyanate, naphthylene 1,5-diisocyanate, 4-isocyanatomethyl-1,8-octane diisocyanate (nonane triisocyanate, triisocyanatononane, TIN), pentamethylene diisocyanate (PDI) and/or undecane 1,6,11-triisocyanate, and any desired mixtures thereof, optionally in a mixture with further di-, tri- and/or polyisocyanates.

The polyisocyanates used with preference in accordance with the invention typically have an isocyanate content of 0.5% to 50% by weight, preferably 3% to 30% by weight, more preferably 5% to 25% by weight.

Preferably in accordance with the invention, in the present process, the higher molecular weight compounds, i.e. those derived from di- or triisocyanates with conversion of some of the isocyanate groups, having isocyanurate, urethane, allophanate, biuret, iminooxadiazinetrione, oxadiazinetrione and/or uretdione groups and based on aliphatic and/or cycloaliphatic isocyanates are used.

In the process of the invention, particular preference is given to using the compounds of relatively high molecular weight that have biuret, iminooxadiazinedione, isocyanurate and/or uretdione groups and are based on hexamethylenediamine diisocyanate, isophorone diisocyanate and/or 4,4'-diisocyanatodicyclohexylmethane.

In step (A) of the process of the invention, the at least one polyisocyanate is reacted with at least one thermally eliminatable blocking agent selected from the group consisting of monofunctional, primary alcohols and mixtures thereof. It is a feature of a primary alcohol in the context of the invention that two protons are attached to the carbon atom to which the hydroxyl group is bonded. Methanol is also included among the primary alcohols. The at least one thermally eliminatable blocking agent used in accordance with the invention in step (A) is preferably chosen such that the elimination from the blocked polyisocyanate is effected, for example, at a temperature above 170° C., preferably 180 to 300° C., more preferably 190 to 250° C. Preferably, the temperature ranges mentioned are applicable in the absence of catalysts that lower the elimination temperature, and in the absence of reactive nucleophiles, for example primary or secondary amines.

It is essential to the invention that, in a first step, the at least one polyisocyanate is reacted with at least one first thermally eliminatable blocking agent selected from the group consisting of primary, monofunctional alcohols and mixtures thereof, preferably in accordance with the invention without blocking all the NCO groups present in this step (A). In general, the at least one thermally eliminatable blocking agent is added in step (A) in an amount sufficient to block 10 to 50 mol %, preferably 20 to 40 mol %, of the isocyanate groups present.

Preferably in accordance with the invention, in step (A) of the process of the invention, 10 to 50 mol %, more preferably 20 to 40 mol %, of the NCO groups present are reacted with the at least one thermally eliminatable blocking agent.

According to the invention, the at least one thermally eliminatable blocking agent used in step (A) is selected from the group consisting of primary, monofunctional alcohols and mixtures thereof.

Suitable primary, monofunctional alcohols are preferably selected from the group consisting of methanol, ethanol, n-propanol, n-butanol, n-pentanol, n-hexanol, n-heptanol, n-butoxyethanol, ethylene glycol monobutyl ether, diethylene glycol monomethyl ether, diethylene glycol monobutyl ether, 2-ethylhexanol, 1-octanol, 1-dodecanol, 1-hexadecanol, 2-methyl-1-propanol, 2,2-dimethyl-1-propanol, 2-methyl-1-butanol and mixtures thereof. The molar mass of suitable primary, monofunctional alcohols is preferably below 250 g/mol, more preferably below 150 g/mol.

Step (A) of the process of the invention can generally be conducted under any reaction conditions that seem suitable to the person skilled in the art.

Step (A) of the process of the invention is preferably conducted at a temperature of 50 to 140° C., more preferably 60 to 110° C.

Step (A) of the process of the invention can be effected in any apparatus that seems suitable to the person skilled in the art, for example in a stirred apparatus.

The at least one polyisocyanate is preferably initially charged here in neat form. It is also possible to conduct step (A) of the process of the invention in a solvent, for example acetone. Then the at least one thermally eliminatable blocking agent is added to the at least one polyisocyanate, preferably in neat form.

In general, the at least one thermally eliminatable blocking agent is added in step (A) in an amount sufficient to block 10 to 50 mol %, preferably 20 to 40 mol %, of the isocyanate groups present.

It is accordingly preferable that at least one polyisocyanate is obtained in step (A) of the process of the invention, the isocyanate groups of which are thermally reversibly blocked to an extent of 10 to 50 mol %, preferably 20 to 40 mol %.

Step (A) of the process of the invention is preferably conducted until the added blocking agent has been fully depleted. The theoretical isocyanate group content of the reaction mixture after step (A) of the process of the invention is generally 10% to 30% by weight, preferably 12% to 20% by weight.

According to the invention, the reaction product obtained in step (A) can be subjected to the workup or purification steps known to the person skilled in the art. Preferably in accordance with the invention, the reaction mixture obtained in step (A) is subjected directly to further treatment in step (B).

Step (B) of the process of the invention comprises the reacting of the at least one partly blocked polyisocyanate from step (A) with at least one nonionic hydrophilizing agent in order to obtain an intermediate.

Preferably in accordance with the invention, the product obtained from step (A) is reacted in step (B). Further preferably, step (B) is effected in the same apparatus in which step (A) has also been effected.

At least one nonionic hydrophilizing agent is used in step (B). According to the invention, in step (B) of the process of the invention, it is generally possible to use any of the nonionic hydrophilizing agents that seem suitable to the person skilled in the art. According to the invention, what is meant by "nonionic" is that the hydrophilizing agent has essentially no ionic or ionogenic groups. It preferably means that the nonionic hydrophilizing agent used in accordance with the invention has neither anionic nor cationic groups, meaning that the amount thereof is <1 equivalent of charge per gram of the hydrophilizing agent. The same applies to ionogenic groups, i.e. groups that can be readily converted to charged species, for example carboxylic acid groups.

Preferably in accordance with the invention, the at least one nonionic hydrophilizing agent is selected from the group of the polyoxyalkylene ethers containing at least one hydroxyl or amino group.

These are obtainable in a manner known per se by alkoxylation of suitable starter molecules. Suitable starter molecules are, for example, saturated monoalcohols selected from the group consisting of methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, for example diethylene glycol monobutyl ether, unsaturated alcohols such as allyl alcohol, 1,1-dimethylallyl alcohol or olein alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine, and heterocyclic secondary amines such as morpholine, pyrrolidine, piperidine or 1H-pyrazole, and mixtures thereof. Preferred starter molecules are saturated monoalcohols. Particular preference is given to using diethylene glycol monobutyl ether as starter molecule.

Alkylene oxides suitable for the alkoxylation reaction are especially ethylene oxide and propylene oxide, which can be used in the alkoxylation reaction in any sequence or else in a mixture.

Preference is given to the blockwise addition of ethylene oxide and propylene oxide to the starter.

The polyalkylene oxide polyethers are either pure polyethylene oxide polyethers or mixed polyalkylene oxide polyethers, the alkylene oxide units of which consist to an extent of at least 30 mol %, preferably to an extent of at least 40 mol %, of ethylene oxide units. Preferred nonionic compounds are monofunctional mixed polyalkylene oxide polyethers having at least 40 mol % of ethylene oxide units and not more than 60 mol % of propylene oxide units. In a particularly preferred variant, aside from the starter, exclusively ethylene oxide units are present.

The nonionic hydrophilizing agents used with preference preferably have a number-average molar mass of 300 to 4000 g/mol, more preferably 400 to 2500 g/mol.

Very particular preference is given to using methoxy polyethylene glycol as nonionic hydrophilizing agent, particular preference to using methoxy polyethylene glycol having a number-average molar mass of 350 to 750 g/mol.

In a preferred variant of the present invention, the hydrophilizing agent used may be eliminated under comparable conditions, i.e. a corresponding temperature, to the blocking agent. However, the hydrophilizing agent is generally nonvolatile under typical baking conditions for a coating.

Step (B) of the process of the invention is preferably conducted at a temperature of 50 to 140° C., more preferably 60 to 120° C.

Step (B) of the process of the invention is preferably conducted until the added hydrophilizing agent has been fully depleted. The theoretical isocyanate group content after step (B) of the process of the invention is generally 3% to 20% by weight, preferably 5% to 15% by weight.

According to the invention, the intermediate obtained in step (B) can be subjected to the workup or purification steps known to the person skilled in the art. Preferably in accordance with the invention, the reaction mixture obtained in step (B) is subjected directly to further treatment in step (C).

In step (B) of the process of the invention, accordingly, at least one polyisocyanate is preferably obtained, the isocyanate groups of which have been blocked, or occupied by a nonionic hydrophilizing agent, to an extent of 20 to 90 mol %, preferably 30 to 80 mol %.

Step (C) of the process of the invention comprises the reacting of the intermediate obtained in step (B) with at least one thermally eliminatable blocking agent selected from the group consisting of primary, monofunctional alcohols and mixtures thereof, in order to obtain the at least one blocked polyisocyanate.

It is possible in accordance with the invention that the thermally eliminatable blocking agents used in step (A) and step (C) are identical. It is also possible in accordance with the invention that the thermally eliminatable blocking agents used in step (A) and step (C) are not identical, but different.

The present invention preferably relates to the process of the invention wherein the at least one thermally eliminatable blocking agent used in step (A) and the at least one thermally eliminatable blocking agent used in step (C) are identical.

Preferably, the at least one thermally eliminatable blocking agent used in step (C) of the process of the invention is selected from the group consisting of primary, monofunctional alcohols and mixtures thereof.

Preferred examples of the compound classes mentioned have been mentioned further up with regard to step (A).

The at least one thermally eliminatable blocking agent used in accordance with the invention in step (C) is preferably chosen such that the elimination from the blocked polyisocyanate is effected, for example, at a temperature above 170° C., preferably 180 to 300° C., more preferably 190 to 250° C. Preferably, the temperature ranges mentioned are applicable in the absence of catalysts that lower the elimination temperature, and in the absence of reactive nucleophiles, for example primary or secondary amines.

Step (C) of the process of the invention can generally be conducted under any reaction conditions that seem suitable to the person skilled in the art.

Step (C) of the process of the invention is preferably conducted at a temperature of 50 to 140° C., more preferably 60 to 120° C.

Step (C) of the process of the invention can be effected in any of the apparatus that seems suitable to the person skilled in the art. Step (C) is preferably effected in the same reactor in which steps (A) and (B) are also conducted.

Preferably in accordance with the invention, the at least one thermally eliminatable blocking agent is added to the intermediate obtained from step (B), preferably in neat form.

In general, the at least one thermally eliminatable blocking agent is added in step (C) in an amount sufficient to block 90 to 120 mol %, preferably 95 to 105 mol %, of the isocyanate groups present prior to performance of step (C).

In step (C) of the process of the invention, accordingly, at least one polyisocyanate is preferably obtained, the isocyanate groups of which have been blocked, or occupied by a nonionic hydrophilizing agent, to an extent of 95 to 100 mol %, preferably 98 to 100 mol %.

Step (C) of the process of the invention is preferably conducted until the added blocking agent has been fully depleted. The theoretical isocyanate group content of the reaction mixture after step (C) of the process of the invention is therefore generally 0% to 1% by weight, preferably 0% to 0.3% by weight.

According to the invention, the reaction product obtained in step (C) can be subjected to the workup or purification steps known to the person skilled in the art, for example filtration and/or thermal treatment.

The reaction steps, especially reaction steps (A), (B) and/or (C), can also be accelerated by adding catalysts to the reaction mixture. Suitable catalysts are the systems known from isocyanate chemistry, for example tertiary amines, tin compounds, zinc compounds or bismuth compounds, or basic salts.

Preferably in accordance with the invention, step (C) is followed by the following step (D):

(D) dispersing the at least one blocked polyisocyanate obtained in step (C) in water.

The optional step (D) of the process of the invention can be conducted by methods known to the person skilled in the art. Preference is given to adding water to the reaction mixture obtained in step (C).

Step (D) of the process of the invention can be conducted at any temperature known to the person skilled in the art. Preference is given to adding the water at a temperature in the dispersing vessel of 5 to 120° C., more preferably 15 to 50° C. Further preferably, the dispersion thus obtained is stirred at a temperature of 20 to 80° C., more preferably 30 to 50° C.

In step (D), preference is given to adding a sufficient amount of water that, after step (D), an aqueous dispersion having a solids content of 20% to 60% by weight, more preferably 30% to 50% by weight, is obtained.

The aqueous dispersion obtained in step (D) preferably has a pH of 4 to 10, more preferably 6 to 8.

The aqueous dispersion obtained in step (D) preferably has a viscosity of 10 to 5000 mPa·s, more preferably 50 to 3000 mPa·s, in each case determined by means of rotational viscometry according to DIN 53019-2008 at 23° C.

The aqueous dispersion obtained in step (D) preferably has a volume-average particle size of 10 to 400 nm, more preferably 20 to 200 nm, in each case determined by means of laser correlation spectroscopy, instrument: Malvern Zetasizer 1000, Malvern Inst. Limited, after dilution of the sample with demineralized water.

As well as the reaction steps specified, there may optionally be further conversions of isocyanate groups, for example by means of NCO-reactive amines and/or alcohols.

For example, it is possible to use organic di- or polyamines, for example ethylene-1,2-diamine, 1,2- and 1,3-diaminopropane, 1,4-diaminobutane, 1,6-diaminohexane, isophoronediamine (IPDA), isomeric mixture of 2,2,4- and 2,4,4-trimethylhexamethylenediamine, 2-methylpentamethylenediamine, diethylenetriamine, 4,4-diaminodicyclohexylmethane and/or dimethylethylenediamine or mixtures of at least two of these.

As a further component, it is optionally possible to use polyols, especially non-polymeric polyols, of said molecular weight range from 62 to 399 mol/g having up to 20 carbon atoms, such as ethylene glycol, diethylene glycol, triethylene glycol, propane-1,2-diol, propane-1,3-diol, butane-1,4-diol, 1,3-butylene glycol, cyclohexanediol, cyclohexane-1,4-dimethanol, hexane-1,6-diol, neopentyl glycol, hydroquinone dihydroxyethyl ether, bisphenol A (2,2-bis(4-hydroxyphenyl)propane), hydrogenated bisphenol A (2,2-bis(4-hydroxycyclohexyl)propane), trimethylolpropane, trimethylolethane, glycerol, pentaerythritol and any desired mixtures thereof with one another.

Examples of polymeric polyols are the following, which are known per se in polyurethane coating technology: polyether polyols, polyester polyols, polyacrylate polyols, polyurethane polyols, polycarbonate polyols, polyester polyacrylate polyols, polyurethane polyacrylate polyols, polyurethane polyester polyols, polyurethane polycarbonate polyols and polyester polycarbonate polyols.

Examples of further suitable compounds are primary/secondary amines, such as methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, diethanolamine, 3-amino-1-methylaminopropane, 3-amino-1-ethylaminopropane, 3-amino-1-cyclohexylaminopropane, 3-amino-1-methylaminobutane, 6-aminohexanoic acid, alanine, aspartic acid, glutamic acid, glutamine, glycine, ethanolamine, 3-aminopropanol, neopentanolamine or mixtures of at least two of these.

For example, it is possible in accordance with the invention to react to 0.1 to 10 mol % of the NCO groups of the present polyisocyanate with further amines or further alcohols which preferably do not correspond to the definition of the blocking agents in step (A) or (C). Preferably in accordance with the invention, none of the further components mentioned here is used.

In the context of this application, the number-average molecular weight of the blocked polyisocyanate dispersion of the invention is determined by gel permeation chromatography (GPC) in DMAc (N,N-dimethylacetamide) as eluent at 23° C. The procedure here is in accordance with DIN 55672-1. The weight-average molecular weight of the blocked polyisocyanates of the invention is preferably 1000 to 100 000 g/mol, more preferably 2000 to 20 000 g/mol.

The content of the acidic ionic and/or ionogenic groups, for example carboxylic acid groups, carboxylate groups, sulfonic acid groups or sulfonate groups, of the blocked polyisocyanate of the invention is preferably low; more preferably, no acidic ionic and/or ionogenic groups are present.

In a preferred embodiment of the invention, the acid number of the blocked polyisocyanates of the invention is below 30 mg KOH/g, preferably below 10 mg KOH/g, very preferably below 5 mg KOH/g, based in each case on the blocked polyisocyanate, i.e. on the reaction product from process steps A) to C) of the invention.

The acid number here indicates the mass of potassium hydroxide in mg required to neutralize 1 g of the sample to be analyzed (measurement to DIN EN ISO 2114—June 2002). The neutralized acids, i.e. the corresponding salts, naturally have no acid number or a reduced acid number.

What is crucial here in accordance with the invention is the acid number of the corresponding free acid.

The present invention also relates to the blocked polyisocyanate obtainable by the process of the invention. It is a feature of the blocked polyisocyanate which is obtained by the present process, with respect to the blocked polyisocyanates obtained from the prior art, that it can be converted more easily to a storage-stable aqueous dispersion. Particularly, the blocked polyisocyanate prepared in accordance with the invention, in aqueous dispersion, has an average particle size of 10 to 400 nm, more preferably 20 to 200 nm, in each case determined by means of laser correlation spectroscopy (instrument: Malvern Zetasizer 1000, Malvern Inst. Limited) after dilution of the sample with demineralized water. The blocked polyisocyanate prepared in accordance with the invention generally has a zeta potential of 0 to −15 V, preferably −0.1 to −15 V.

The present invention also relates to a polyisocyanate at least partly blocked by at least one thermally eliminatable blocking agent selected from the group consisting of primary, monofunctional alcohols and mixtures thereof, and hydrophilized with at least one nonionic hydrophilizing agent, characterized in that it has a zeta potential of 0 to −15 V, preferably −0.1 to −15 V. The zeta potential is determined by diluting a small amount of the sample significantly with 1 molar potassium chloride solution and homogenizing by stirring. The pH of 8.0 is established using dilute hydrochloric acid or sodium hydroxide solution. The zeta potential is then determined in the "ZetaSizer 3000HSA" (Malvern Instruments, Herrenberg, Germany) at 23° C.

In a preferred embodiment of the invention, the acid number of the blocked polyisocyanates of the invention is below 30 mg KOH/g of polymer, preferably below 10 mg KOH/g of polymer, very preferably below 5 mg KOH/g of polymer. The acid number of the blocked polyisocyanates of the invention is preferably at least 0 mg KOH/g of polymer. The acid number here indicates the mass of potassium hydroxide in milligrams required to neutralize 1 g of the sample to be examined (measurement to DIN EN ISO 2114—June 2002). The neutralized acids, i.e. the corresponding salts, naturally have a zero or reduced acid number. What is crucial here in accordance with the invention is the acid number of the corresponding free acid. With regard to the blocked polyisocyanate of the invention, the statements made with regard to the process of the invention are correspondingly applicable in respect of the general and preferred embodiments.

The blocked polyisocyanate dispersions of the invention may be used, for example, for production of preferably bakeable coating compositions (baking varnishes), for coating of substrates, preferably made of metals, mineral materials, glass, wood or plastics. Substrates suitable in accordance with the invention here are, for example, surfaces, fibers, particles, wovens, knits, nonwovens and combinations thereof. For this purpose, the coating compositions of the invention may be applied by painting, knife coating, dipping, spray application such as compressed air spraying or airless spraying, and by electrostatic application, for example high-speed rotating bell application. The dry film thickness may, for example, be 0.01 to 120 μm. The dried films are preferably cured by baking within the temperature range from 90 to 190° C., preferably 110 to 180° C., more preferably 120 to 160° C. In the case of coating of fibers, the crosslinking can proceed in the course of fiber drying or in the course of a subsequent heat treatment. The crosslinking may alternatively also be accomplished essentially or partly in the course of compounding with a polymer matrix.

The present invention also relates to the use of the blocked polyisocyanate of the invention for production of coating compositions, adhesives, sealants or elastomers.

The present invention also relates to coating composition, adhesive, sealant or elastomer comprising at least one blocked polyisocyanate of the invention.

The present invention also relates to substrates provided with coatings obtainable using the at least one blocked polyisocyanate of the invention.

For production of coating compositions (baking varnishes), of adhesives and elastomers, the polyisocyanate-crosslinker dispersions of the invention having blocked isocyanate groups may be mixed with at least difunctional, isocyanate-reactive compounds, for example any desired polyol components, preferably in the form of aqueous dispersions.

Such polyol components may be polyhydroxy polyesters, polyhydroxy polyurethanes, polyhydroxy polyethers, polycarbonate diols or polymers having hydroxyl groups, for example the polyhydroxy polyacrylates, polyacrylate polyurethanes and/or polyurethane polyacrylates that are known per se. These generally have a hydroxyl number of 20 to 200 mg KOH/g, preferably of 50 to 130 mg KOH/g. The hydrophilic modification of these polyhydroxyl compounds which are typically required for production of dispersions is effected by methods known per se, as disclosed, for example, in EP-A-0 157 291, EP-A-0 498 156 or EP-A-0 427 028.

Also possible is a mixture with other alcohol-reactive compounds, for example amino crosslinker resins, for example melamine resins and/or urea resins, for additional crosslinking in the course of baking.

The varnishes, paints, adhesives and other formulations are produced from the dispersions of the invention by methods known per se. Apart from the blocked polyisocyanates and any polyols or film formers, it is possible to add customary additives and other auxiliaries (e.g. pigments, fillers, leveling agents, defoamers, catalysts, separating agents, antistats) to the formulations.

The present invention is elucidated by examples.

EXAMPLES

Chemicals Used:

Desmodur® Ultra N 3300 isocyanurate based on hexamethylenediamine diisocyanate, Covestro Deutschland AG, Leverkusen, DE The further chemicals were purchased from Sigma-Aldrich Chemie GmbH, Taufkirchen, DE.

Unless stated otherwise, all percentages are percent by weight (% by weight).

Unless stated otherwise, all analytical measurements were conducted at a temperature of 23° C.

The viscosities reported were determined by means of rotary viscometry to DIN 53019-2008 at 23° C. with a rotary viscometer from Anton Paar Germany GmbH, Ostfildern, DE.

NCO contents, unless explicitly stated otherwise, were determined by volumetric means to DIN-EN ISO 11909-2007.

The reported particle sizes were determined by means of laser correlation spectroscopy (instrument: Malvern Zetasizer 1000, Malvern Inst. Limited) after dilution of the sample with demineralized water.

The solids contents were ascertained by heating a weighed sample to 120° C. At constant weight, the solids content was calculated by reweighing the sample.

The check for free NCO groups was conducted by means of IR spectroscopy (band at 2260 cm$^{-1}$).

As a storage test, 250 ml of the dispersion in each case was dispensed and stored both at room temperature and at 40° C. There was a visual check as to whether sediment had formed. Samples with sediment were assessed as being unstable.

The zeta potential is determined by diluting a small amount of the sample significantly with 1 molar potassium chloride solution and homogenizing by stirring. The pH of 8.0 is established using dilute hydrochloric acid or sodium hydroxide solution. The zeta potential is then determined in the "ZetaSizer 3000HSA" (Malvern Instruments, Herrenberg, Germany) at 23° C.

Acid number is determined to DIN EN ISO 2114—June 2002.

Inventive example: Butyl glycol (BG, butoxyethanol) as blocking agent

A standard stirred apparatus was initially charged with 234 g of Desmodur Ultra N 3300 and heated at 40° C. Subsequently, 68.9 g of butoxyethanol was slowly added to the melt such that the temperature did not exceed 80° C. 91.8 g of methoxy polyethylene glycol having a number-average molar mass of 750 g/mol was then added, and the mixture was stirred at 80° C. until the theoretical isocyanate content went below about 5.25% by weight. Subsequently, 53.9 g of butoxyethanol was slowly added to the melt such that the temperature did not exceed 80° C. The mixture was stirred at 80° C. until it was no longer possible to detect any isocyanate groups by IR spectroscopy. Then 580 g of deionized water was added with vigorous stirring, with stirring at 40° C. for a further 180 minutes.

The Resultant Dispersion had the Following Properties:
Solids content: about 39% by weight
pH: about 5.3
Viscosity about 70 mPa·s
Average particle size (LCS): 66 nm
Zeta potential: −12.5 mV
Acid number: 0.20 mg KOH/g The dispersion was storage-stable at room temperature and at 40° C. for at least 4 weeks. No phase separation formed within this period of time.

The invention claimed is:

1. A process for preparing an aqueous dispersion, comprising:
   (1) preparing at least one blocked polyisocyanate by a process comprising:
      (A) reacting at least one polyisocyanate with at least one thermally eliminatable blocking agent selected from the group consisting of primary, monofunctional alcohols and mixtures thereof, in order to obtain at least one partly blocked polyisocyanate,
      (B) reacting the at least one partly blocked polyisocyanate from step (A) with at least one nonionic hydrophilizing agent selected from the group consisting of polyoxyalkylene ethers containing a single hydroxyl group, in order to obtain an intermediate, and
      (C) reacting the intermediate obtained in step (B) with at least one thermally eliminatable blocking agent selected from the group consisting of primary, monofunctional alcohols and mixtures thereof, in order to obtain the at least one blocked polyisocyanate, wherein the theoretical isocyanate group content of the reaction mixture after step (C) is 0% by weight; and (2) preparing the aqueous dispersion by:
      (D) dispersing the at least one blocked polyisocyanate obtained in step (C) in water to form the aqueous dispersion, the at least one blocked polyisocyanate obtained in step (C) being the only at least one blocked polyisocyanate in the aqueous dispersion.

2. The process as claimed in claim 1, wherein the at least one polyisocyanate is selected from the group consisting of compounds which have isocyanurate, urethane, allophanate, biuret, iminooxadiazinetrione, oxadiazinetrione and/or uretdione groups, and are based on aliphatic and/or cycloaliphatic diisocyanates.

3. The process as claimed in claim 1, wherein the at least one polyisocyanate is selected from the group consisting of compounds which have biuret, iminooxadiazinedione, isocyanurate and/or uretdione groups are based on hexamethylene diisocyanate, isophorone diisocyanate, 4,4'-diisocyanatodicyclohexylmethane, or a combination thereof.

4. The process as claimed in claim 1, wherein the at least one thermally eliminatable blocking agent used in step (A) and the at least one thermally eliminatable blocking agent used in step (C) are identical.

5. The process as claimed in claim 1, wherein the aqueous dispersion has a volume average particle size of 10 to 400 nm, determined in each case by means of laser correlation spectroscopy after dilution of the sample with demineralized water.

6. An aqueous dispersion obtained by the process claimed in claim 1.

7. A method for producing coating compositions, adhesives, sealants or elastomers comprising providing the aqueous dispersion as claimed in claim 6.

8. A coating composition, adhesive, sealant or elastomer comprising the aqueous dispersion as claimed in claim 6.

9. The process as claimed in claim 1, wherein the process is solvent-free.

10. The process as claimed in claim 1, wherein the isocyanate groups of the intermediate obtained in step (B) have been blocked or occupied by the nonionic hydrophilizing agent, in a proportion ranging from 20 to 90 mol %.

11. The process as claimed in claim 1, wherein hydrophilizing agents other than the at least one nonionic hydrophilizing agent, are excluded.

12. The process as claimed in claim 1, wherein the process is solvent-free and wherein the isocyanate groups of the intermediate obtained in step (B) have been blocked or occupied by the nonionic hydrophilizing agent, in a proportion ranging from 20 to 90 mol %.

13. The process as claimed in claim 1, wherein the process is solvent-free and wherein the isocyanate groups of the intermediate obtained in step (B) have been blocked or occupied by the nonionic hydrophilizing agent, in a proportion ranging from 20 to 90 mol % and wherein hydrophilizing agents other than the at least one nonionic hydrophilizing agent, are excluded.

14. The aqueous dispersion as claimed in claim 6, wherein the process is solvent-free.

15. The aqueous dispersion as claimed in claim 6, wherein the process is solvent-free and wherein the isocyanate groups of the intermediate obtained in step (B) have been blocked or occupied by the nonionic hydrophilizing agent, in a proportion ranging from 20 to 90 mol %.

16. The aqueous dispersion as claimed in claim 6, wherein the process is solvent-free and wherein the isocyanate groups of the intermediate obtained in step (B) have been blocked or occupied by the nonionic hydrophilizing agent, in a proportion ranging from 20 to 90 mol % and wherein hydrophilizing agents other than the at least one nonionic hydrophilizing agent, are excluded.

17. The coating composition, adhesive, sealant or elastomer as claimed in claim 8, wherein the process for preparing the aqueous dispersion is solvent-free.

18. The coating composition, adhesive, sealant or elastomer as claimed in claim 8, wherein the process for preparing the aqueous dispersion is solvent-free and wherein the isocyanate groups of the intermediate obtained in step (B) have been blocked or occupied by the nonionic hydrophilizing agent, in a proportion ranging from 20 to 90 mol %.

19. The coating composition, adhesive, sealant or elastomer as claimed in claim 8, wherein the process for preparing the aqueous dispersion is solvent-free and wherein the isocyanate groups of the intermediate obtained in step (B) have been blocked or occupied by the nonionic hydrophilizing agent, in a proportion ranging from 20 to 90 mol % and wherein hydrophilizing agents other than the at least one nonionic hydrophilizing agent, are excluded.

\* \* \* \* \*